(12) United States Patent
Pikus et al.

(10) Patent No.: US 9,296,061 B2
(45) Date of Patent: Mar. 29, 2016

(54) SYSTEMS AND METHODS FOR THERMALLY WORKING A WORKPIECE

(71) Applicant: Messer Cutting Systems Inc., Menomonee Falls, WI (US)

(72) Inventors: Kenneth James Pikus, New Berlin, WI (US); Reinald Vossberg, Hofheim (DE)

(73) Assignee: Messer Cutting Systems Inc., Menomonee Falls, WI (US)

( * ) Notice: Subject to any disclaimer, the term of this patent is extended or adjusted under 35 U.S.C. 154(b) by 127 days.

(21) Appl. No.: 14/162,345

(22) Filed: Jan. 23, 2014

(65) Prior Publication Data

US 2014/0217070 A1    Aug. 7, 2014

Related U.S. Application Data

(60) Provisional application No. 61/761,475, filed on Feb. 6, 2013.

(51) Int. Cl.
*B23K 10/00* (2006.01)
*B23K 10/02* (2006.01)
(Continued)

(52) U.S. Cl.
CPC . *B23K 10/02* (2013.01); *B23K 5/24* (2013.01); *B23K 7/00* (2013.01); *B23K 7/10* (2013.01); *B23K 10/00* (2013.01); *B23K 28/02* (2013.01); *H05H 1/34* (2013.01)

(58) Field of Classification Search
CPC ............ B23K 10/02; B23K 7/00; B23K 5/24; B23K 10/00; B23K 28/02; H05H 1/34

USPC ............ 219/121.36, 121.51, 121.48, 121.39, 219/121.59

See application file for complete search history.

(56) References Cited

U.S. PATENT DOCUMENTS 4,469,932 A    9/1984  Spiegelberg et al.
4,767,102 A    8/1988  Dube
(Continued)

FOREIGN PATENT DOCUMENTS

DE    195 46 677 A1    6/1997
DE    101 44 177 A1    4/2003
(Continued)

OTHER PUBLICATIONS

International Search Report and Written Opinion, PCT International Application No. PCT/US2014/012840, mailed Jun. 11, 2014.
(Continued)

*Primary Examiner* — Mark Paschall
(74) *Attorney, Agent, or Firm* — Andrus Intellectual Property Law, LLP

(57) ABSTRACT

A system for thermally working a workpiece has a torch body having a first axial end positionable near the workpiece and a torch receptacle coupled to a second axial end of the torch body. A plurality of ports extend axially through the torch receptacle from a first axial end of the torch receptacle to a second axial end of the torch receptacle. A plurality of fittings provided at the second axial end of the torch body for communication with a subset of the plurality of ports. The torch body comprises one of a plasma torch body and an oxy-fuel torch body that is exchangeably coupled to the torch receptacle. The subset of the plurality of ports is a plasma subset when the plasma torch body is coupled to the torch receptacle and an oxy-fuel subset when the oxy-fuel torch body is coupled to the torch receptacle.

19 Claims, 7 Drawing Sheets

(51) Int. Cl.
*B23K 7/00* (2006.01)
*B23K 5/24* (2006.01)
*B23K 7/10* (2006.01)
*B23K 28/02* (2014.01)
*H05H 1/34* (2006.01)

(56) References Cited

U.S. PATENT DOCUMENTS

| | | | |
|---|---|---|---|
| 5,256,212 A | 10/1993 | Magnuson | |
| 6,903,300 B2 | 6/2005 | Faust et al. | |
| 8,097,204 B2 | 1/2012 | Flaig et al. | |
| 8,129,651 B2 | 3/2012 | Skelton | |
| 8,389,887 B2 | 3/2013 | Liebold et al. | |
| 2012/0103947 A1* | 5/2012 | Flaig | B23K 7/001 219/121.44 |
| 2014/0197146 A1* | 7/2014 | Forlong | B22D 11/126 219/121.84 |
| 2015/0127137 A1* | 5/2015 | Brandt | B23K 5/00 700/166 |

FOREIGN PATENT DOCUMENTS

| | | |
|---|---|---|
| DE | 10 2008 056278 A1 | 4/2010 |
| EP | 0 312 861 A1 | 4/1989 |
| EP | 1 423 644 B1 | 12/2010 |
| WO | 03023278 A1 | 3/2003 |
| WO | 2006100936 A1 | 9/2006 |

OTHER PUBLICATIONS

CNC Oxyfuel/Plasma Profile Cutting Machine, by Kelachandra Precision Engineers, https://web.archive.org/web/20080728044914/http://kelpecnc.com/cnc%20oxy.htm, Jul. 2008.

Twister TFP3062 with Oxy Propane Torch Attachment Option, by Komatsu America Industries LLC, www.komatsuplasma.com/kai/cdt/en/tfp3062_oxy/, web site visited on Dec. 18, 2013.

Komatsu Twister TFP3062 with Oxy Propane Torch Attachment Option, by Komatsu America Industries LLC, www.youtube.com/watch?v=4YMu499Zlmk, video posted on Oct. 19, 2012, web site visited on Feb. 4, 2014.

Oxy Propane Torch Attachment Option for Twister TFP3062 extends steel cutting thickness to 2 inches, by Komatsu America Industries LLC, www.komatsuplasma.com, web site visited on Feb. 4, 2014.

Twister TFP3062 with Oxy Propane Torch Attachment Option, by Komatsu America Industries LLC, www.komatsuplasma.com/kai/ctd/en/tfp3062_oxy/, web site visited on Dec. 18, 2013.

International Preliminary Report on Patentability, PCT International Application No. PCT/US2014/012840, mailed Aug. 20, 2015.

* cited by examiner

US 9,296,061 B2

SYSTEMS AND METHODS FOR THERMALLY WORKING A WORKPIECE

CROSS-REFERENCE TO RELATED APPLICATION

The present application claims the benefit of U.S. Provisional Patent Application No. 61/761,475, filed on Feb. 6, 2013, the content of which is incorporated herein by reference in its entirety.

FIELD

The present disclosure relates to systems and methods for thermally working a workpiece. More specifically, the present disclosure relates to welding, or cutting a workpiece using a plasma torch or an oxy-fuel torch.

BACKGROUND

Plasma cutting and welding are achieved through the use of a plasma torch. During plasma cutting, an inert gas is blown at high speed out of a nozzle of the plasma torch. At the same time an electrical arc is formed through the inert gas from the nozzle to the surface of a workpiece. The electrical arc turns some of the inert gas to plasma. The plasma jet is sufficiently hot to melt the workpiece. The plasma jet is also blowing fast enough to blow molten metal away from the cut in the workpiece. Plasma welding utilizes a similar concept, only the plasma jet does not penetrate as deeply into the workpiece.

Thermal working of a workpiece can also be accomplished using an oxy-fuel torch. An oxy-fuel torch uses fuel gases and oxygen to weld or cut a workpiece. During oxy-fuel welding, oxygen is used to increase the temperature of a flame emitted from the torch to allow localized melting of the workpiece. During oxy-fuel cutting, the torch is used to heat the metal to its kindling temperature. A stream of cutting oxygen is then trained on the workpiece to cut the workpiece.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

A system for thermal working a workpiece comprises a torch body having a first axial end positionable near the workpiece and a torch receptacle coupled to a second axial end of the torch body. A plurality of ports extend through the torch receptacle from a first axial end of the torch receptacle to a second axial end of the torch receptacle. A plurality of fittings are provided at the second axial end of the torch body for communication with a subset of the plurality of ports. The torch body comprises one of a plasma torch body and an oxy-fuel torch body that is exchangeably coupled to the torch receptacle. The subset of the plurality of ports is a plasma subset when the plasma torch body is coupled to the torch receptacle and the subset of the plurality of ports is an oxy-fuel subset when the oxy-fuel torch body is coupled to the torch receptacle.

A method for thermally working a workpiece comprises providing a torch receptacle having a plurality of ports extending axially therethrough from a first axial end of the torch receptacle to a second axial end of the torch receptacle. The method comprises exchangeably coupling one of a plasma torch body and an oxy-fuel torch body to the first axial end of the torch receptacle and providing gas and electricity via the plurality of ports to the torch body so as to thermally work the workpiece. The plasma torch body has a plurality of fittings for coupling with a plasma subset of the plurality of ports. The oxy-fuel torch body has a plurality of fittings for coupling with an oxy-fuel subset of the plurality of ports.

BRIEF DESCRIPTION OF THE DRAWINGS

The present disclosure is described with reference to the following Figures. The same numbers are used throughout the Figures to reference like features and like components.

DETAILED DESCRIPTION

Figure 1:
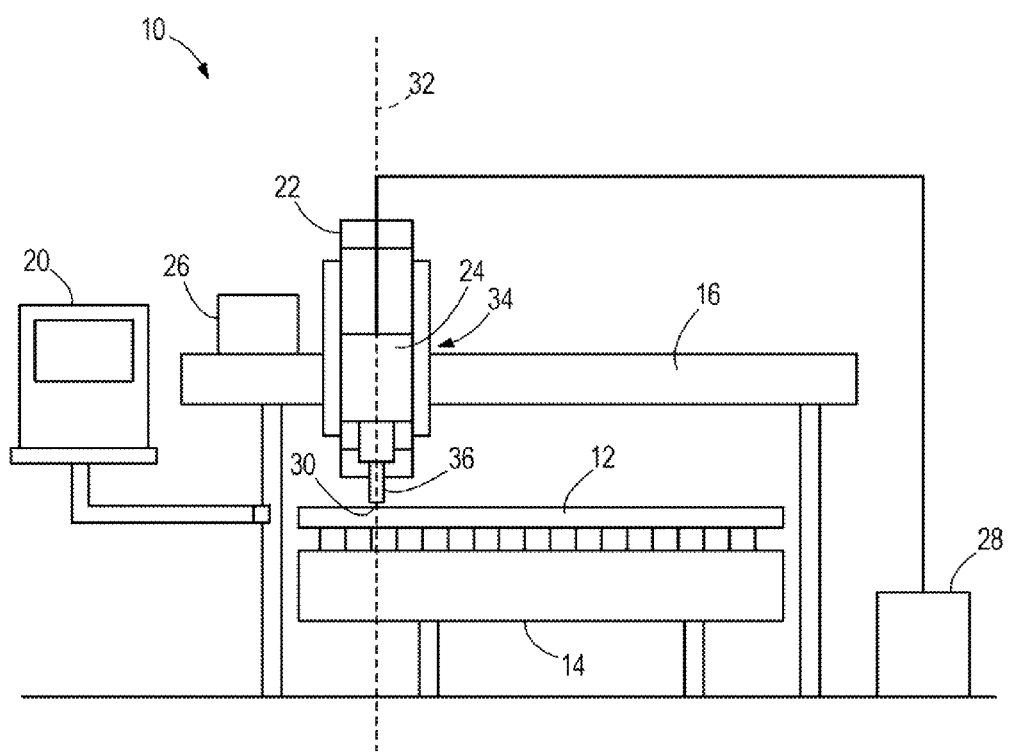
FIG. 1 depicts one example of a system for thermally working a workpiece.

FIG. 1 depicts one example of a system 10 for thermally working a workpiece 12. The workpiece is positionable upon a table 14 below a gantry 16 that holds a torch assembly 34. A computerized numeric controller (CNC) 20 is provided to control movement of the torch assembly 34 via a height controller 22, an automatic process controller 24 and a driver system 26. A power supply 28 provides electrical power to each of the torch assembly 34, CNC 20, height controller 22, automatic process controller 24, and driver system 26, although all of such connections are not shown herein. The power supply 28 can be a single power supply, or can comprise multiple power supplies at various locations within the system 10.

The torch assembly 34 includes a torch body 36 having a first axial end 30 positionable near the workpiece 12. Generally, the torch assembly 34 is moveable in each of an x direction, y direction, and z direction by control provided via the CNC 20, height controller 22, automatic process controller 24, and driver system 26. In FIG. 1, the z axis is labeled as 32. It should be apparent from FIG. 1 that the torch assembly 34 and related components take up space with respect to the table 14, the workpiece 12, and the gantry 16. Generally, when it is desired to provide both plasma working capabilities and oxy-fuel working capabilities on the same system 10, two separate torch assemblies 34 must be provided along the gantry 16, one for an oxy-fuel torch and one for a plasma torch. The present inventors have recognized that in order to save space, it is desirable to provide the capability to thermally work the workpiece 12 using one of a plasma torch and an oxy-fuel torch, which torches are exchangeably provided in the same torch assembly 34 along one z axis. This also reduces cost because only one torch assembly 34 is required for the exchangeable torch body 36. Such exchangeability is realized through re-design of a torch receptacle, as described herein below.

Figure 2:
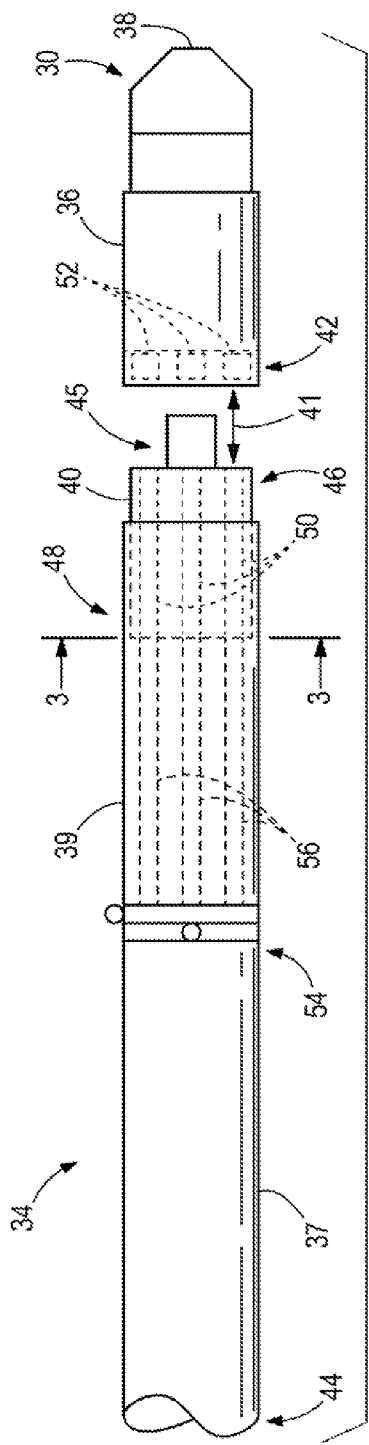
FIG. 2 depicts one example of a torch assembly for thermally working a workpiece.

Now with reference to FIGS. 2-3, the torch assembly 34 will be described in more detail. The torch assembly 34 comprises a torch body 36 having a first axial end 30 positionable near the workpiece 12, as described herein above. The first axial end 30 comprises a nozzle 38 for directing heating, cutting, and/or welding gases at the workpiece 12. The torch assembly 34 further comprises a torch receptacle 40 coupled to a second axial end 42 of the torch body 36. The torch receptacle 40 has a first axial end 46 and a second axial end 48. Although FIG. 2 shows the torch receptacle 40 and the torch body 36 in an uncoupled state, it should be understood that the torch receptacle 40 and the torch body 36 can be coupled as shown by arrow 41. For example, the first axial end 46 of the torch receptacle 40 comprises a quick-connect fitting 45 for mating with a quick-connect fitting on the second axial end 42 of the torch body 36.

Figure 4:
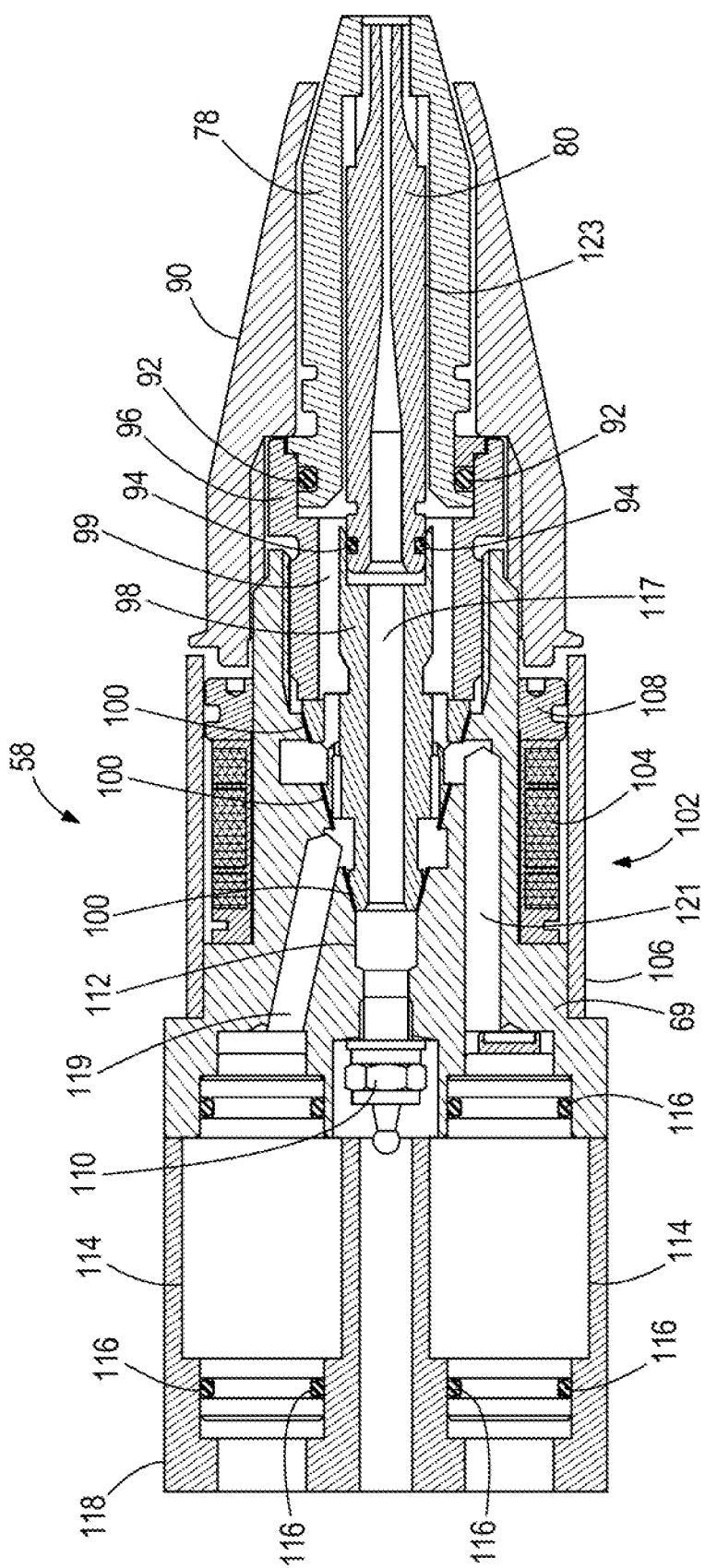
FIG. 4 depicts one example of a portion of an oxy-fuel torch body.
Figure 5:
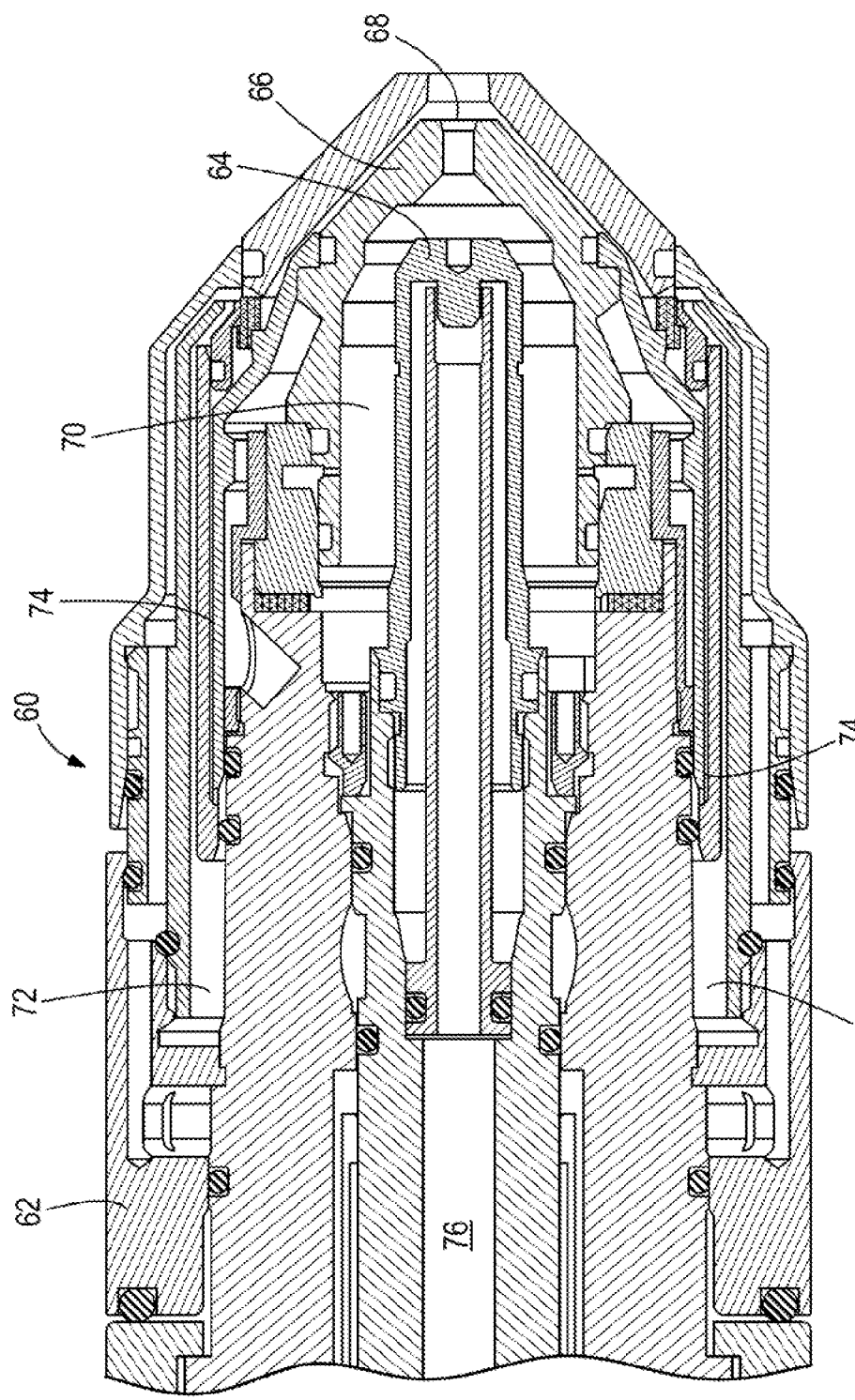
FIG. 5 depicts one example of a portion of a plasma torch body.

A plurality of ports 50 extend axially through the torch receptacle 40 from the first axial end 46 to the second axial end 48 of the torch receptacle 40. A plurality of fittings 52 are provided at the second axial end 42 of the torch body 36 for communication with a subset of the plurality of ports 50, as will be described further herein below. The subset depends on whether the torch body 36 coupled to the torch receptacle 40 is an oxy-fuel torch body 69 (FIG. 4) or a plasma torch body 62 (FIG. 5). The present inventors have realized that providing a torch body 36 that is exchangeable on the torch receptacle 40 allows for very quick switching from plasma cutting to oxy-fuel cutting, as the entire torch body 36 can be swapped out using the quick connect fitting 45, and torch consumables (e.g., nozzles) do not need to be replaced during such swapping.

The torch assembly 34 further comprises a torch lead set 54. The torch lead set 54 comprises a plurality of leads 56 covered by a braided cover 37 and a sleeve 39. The plurality of leads 56 connect to the plurality of ports 50. Although only three leads 56 and ports 50 are shown, herein, it should be understood that more can be provided. Although not shown herein, the leads 56 run all the way through the torch lead set 54, including through braided cover 37. The torch lead set 54 is connectable at a distal end 44 to gas and power supplies, as will be further described herein below.

Figure 3:
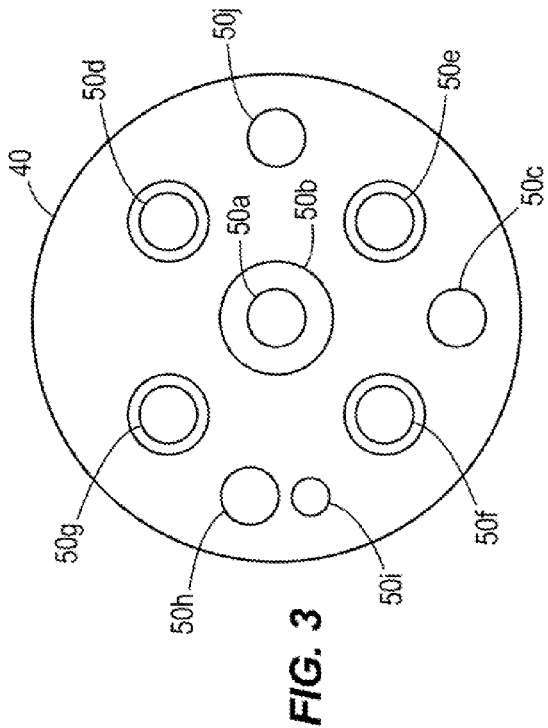
FIG. 3 depicts one example of an end view of a torch receptacle.

FIG. 3 depicts an end view of the second axial end 48 of the torch receptacle 40 along the line 3-3 of FIG. 2. As mentioned above, the torch receptacle 40 comprises a plurality of ports, herein labeled 50a-50j. The ports 50a-50j provide passages for gases and electrical wires needed for facilitating oxy-fuel working and/or plasma working. For example, port 50c may comprise a coolant supply port and port 50b may comprise a coolant return port. Port 50d may provide a plasma gas when a plasma torch body is connected to the torch receptacle 40, and may provide a fuel gas when an oxy-fuel torch body is connected to the torch receptacle 40. Port 50e may comprise a port to vent to the atmosphere when a plasma torch body is connected to the torch receptacle 40, and may comprise a port for ignition gas (a mixture of oxygen and fuel gas) when an oxy-fuel torch body is connected to the torch receptacle 40. Port 50f may provide a shield gas when a plasma torch body is connected to the torch receptacle 40 and may provide a low pressure heating oxygen gas when an oxy-fuel torch body is connected to the torch receptacle 40. Port 50a may provide high pressure cutting oxygen when an oxy-fuel torch body is connected to the torch receptacle 40.

Electrical wires can also be run through the ports 50. For example, port 50a may provide passage of an electrical wire for providing a negative lead to an electrode of a plasma torch body. Port 50h may provide passage of an electrical wire that serves as a pilot arc wire when a plasma torch body is connected to the torch receptacle 40 and that serves as an igniter wire when an oxy-fuel torch body is connected to the torch receptacle 40. Port 50i may provide passage of electrical wires for providing power to a magnetic height sensing system when an oxy-fuel torch body is connected to the torch receptacle 40. Port 50j may provide passage of an electrical wire that can be used to sense the initial height (or obtain the initial starting point) of the plasma torch body relative to the workpiece 12 when a plasma torch body is connected to the torch receptacle 40.

Different gas supply passages and electrical connections are required depending on whether a workpiece is being thermally worked with an oxy-fuel torch or a plasma torch. Therefore, the present disclosure provides for an oxy-fuel torch body having a plurality of fittings that communicate with an oxy-fuel subset of the plurality of ports 50 when an oxy-fuel torch body is coupled to the torch receptacle 40. The present disclosure also provides for a plasma torch body having a plurality of fittings that communicate with a plasma subset of the plurality of ports 50 when a plasma torch body is coupled to the torch receptacle 40. It should be understood that the plurality of leads 56 also comprises a plasma subset that communicates with the plasma subset of the plurality of ports 50 and an oxy-fuel subset that communicates with the oxy-fuel subset of the plurality of ports 50. However, as described herein below, one or more ports in the plasma subset of the plurality of ports 50 is common with one or more ports in the oxy-fuel subset of the plurality of ports 50. Similarly, a corresponding lead in the plasma subset of the plurality of leads 56 is common with a lead in the oxy-fuel subset of the plurality of leads 56. This makes connection of the torch body 36 to the torch receptacle 40 quick, and saves space, as the torch body 36 can remain compact.

Now turning to FIG. 4, an oxy-fuel torch 58 for use with the system 10 of the present disclosure will be described. The oxy-fuel torch 58 comprises a torch body 69 holding a heating nozzle 78 and a cutting nozzle 80. A retaining cap 90 holds the heating nozzle and cutting nozzle in place on the torch body 69. The heating nozzle 78 and cutting nozzle 80 are held within the torch body 69 by quick connect fittings and o-rings. For example, the heating nozzle 78 is held by an o-ring 92 and the cutting, nozzle 80 is held by an o-ring 94. The quick connect fittings are the subject of European Patent No. 1423644, which is hereby incorporated by reference in its entirety. The o-ring 92 holds the heating, nozzle 78 within a locking nut 96. The locking nut 96 radially surrounds a mixer unit 98. A mixing chamber 99 is defined by the mixer unit 98 and the locking nut 96. The mixing chamber 99 compresses mixed fuel gas and oxygen to correct its pressure and concentration before providing the mixed gas to the heating nozzle 78. The mixer unit 98 has flexible seal faces that are, for example, Teflon coated, as shown at 100. This allows for good sealing without requiring a large force to tightly hold the mixer unit 98 within the oxy-fuel torch body 69.

The oxy-fuel torch body 69 further comprises a height sensing system, shown in this example as an internal magnetic height sensing system 102. The internal magnetic height sensing system 102 comprises sensor coils 104 held within the torch body by a guiding sleeve 106 and a locking nut 108. The internal magnetic height sensing, system 102 operates according the principles described in U.S. Pat. No. 6,903,300, which is hereby incorporated by reference in its entirety.

Because the internal magnetic height sensing system 102 is sensitive to heat buildup, it may be beneficial to provide coolant, for example via coolant ports 50b, 50c and fittings 52b. 52c (similar to when using a plasma torch body). However, coolant passages are not shown here. It should be understood that an internal magnetic height sensing system 102 as shown here is not the only way to sense the height of the torch from the workpiece 12. For example, a capacitive height sensing system could instead be used. Further, the height sensing system could be a magnetic system, but alternatively provided externally of the oxy-fuel torch body 69.

The oxy-fuel torch body 69 further comprises a glow plug 110 for internal ignition. An ignition gas is fed into an ignition chamber 112 for ignition by the glow plug 110. In an alternative embodiment, a spark plug is used instead of the glow plug 110 shown herein.

The oxy-fuel torch body 69 further has internal flashback arrestors 114. The flashback arrestors 114 are safety devices that prevent propagation of a flame caused by molten material being, thrown back into the oxy-fuel torch body 69. The flashback arrestors 114 are held within the torch body 69 using rubber o-ring seals 116. The flashback arrestors 114 can be provided as individual flashback arrestors or as a complete cartridge comprising a set of four flashback arrestors. In the embodiment shown, the flashback arrestors 114 are shown as a complete cartridge (a set of four) within a flashback arrestor housing 118. Integrating the flashback arrestors 114 into the oxy-fuel torch body 69 allows the oxy-fuel torch body 69 to be quickly and easily connected to the torch receptacle 40, as opposed to requiring connection of external flashback arrestors.

Several passages are provided for gases to flow through the oxy-fuel torch body 69. Passage 117 allows for flow of an ignition gas upon ignition of the oxy-fuel torch 58. Later, after ignition, passage 117 provides for flow of high pressure cutting oxygen. Passage 119 provides for passage of low pressure oxygen used to heat the workpiece and passage 121 provides for passage of fuel gas used to heat the workpiece. The low pressure oxygen and the fuel gas provided through passages 119 and 121, respectively, are mixed in the mixing chamber 99 and provided to the workpiece through the heating nozzle 78 via passages 123.

Figure 6:
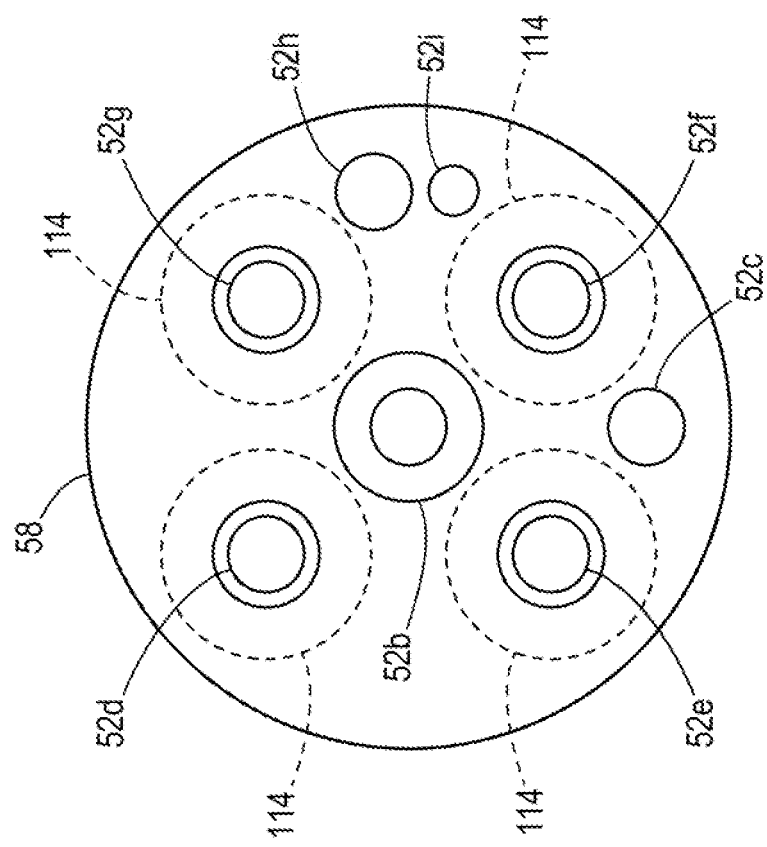
FIG. 6 depicts one example of an end view of an oxy-fuel torch body.

With reference to FIG. 6, an end view of the second axial end 42 of the oxy-fuel torch body 69 will be described. The oxy-fuel torch body 69 comprises a plurality of fittings 52 for communication with an oxy-fuel subset of the plurality of ports 50 in the torch receptacle 40 (see FIG. 3). For example, the oxy-fuel torch body 69 comprises a fitting 52b that is a coolant return fitting for coolant that is delivered via coolant supply port 52c. These coolant supply and return fittings 52c, 52b are optional, as generally oxy-fuel torches do not utilize coolant. The oxy-fuel torch body 69 further comprises a fitting 52d for providing a fuel gas to the oxy-fuel torch body 69, a fitting 52e for providing an ignition gas (oxygen and fuel gas mixture) to the oxy-fuel torch body 69, a fitting 52f for providing low pressure heating oxygen gas to the oxy-fuel torch body 69, and a fitting 52g for providing high pressure cutting oxygen gas to the oxy-fuel torch body 69. The oxy-fuel torch body 69 further comprises a fitting 52h for passage of an igniter wire into the oxy-fuel torch body 69 and a fitting 52i for passing coil wires for the magnetic height sensing system 102 into the oxy-fuel torch body 69. Clearly, these fittings 52b, 52c, 52d, 52e, 52f, 52g, 52h, and 52i correspond and communicate with the ports 50 provided in the torch receptacle 40, as shown in FIG. 3. Together then the ports 50b, 50c, 50d, 50e, 50f, 50g, 50h, and 50i comprise the oxy-fuel subset of the plurality of ports 50.

Each of the fittings 52 are in fluid communication with the passages in the oxy-fuel torch body 69 described herein above with reference with FIG. 4. For example, the fitting 52d (fuel gas) is in fluid communication with the passage 121. The fitting 52e (ignition gas) is in fluid communication with the passage 117. The fining 52f (low pressure oxygen) is in fluid communication with the passage 119. The fitting 52g (high pressure oxygen) is in fluid communication with the passage 117. Similarly, the fittings for providing electrical wires to the ox-fuel torch body 69 communicate with passageways in the oxy-fuel torch body 69 as well.

Now with reference to FIG. 5, a plasma torch 60 for use with the present system 10 will be described. The plasma torch 60 comprises a plasma torch body 62, an electrode 64 (e.g. cathode) mounted within the plasma torch body 62, and a nozzle 66 (e.g. anode) with a central orifice 68 that produces a pilot arc to the electrode 64 to initiate a plasma arc. Also depicted are a passageway for an electrical connection 76, passages for plasma gas 70, passages for cooling liquid 72, and passages for shield gas 74. Although not shown herein, the plasma torch body 62 may further comprise a wire for sensing an initial height of the plasma torch 60 upon positioning near the workpiece and a passage for venting plasma gas back to the atmosphere.

Now with reference to FIG. 7, an end view of the plasma torch body 62 at the second axial end 42 of the plasma torch body 62 will be described. The plasma torch body 62 comprises a plurality of fittings 52a, 52b, 52c, 52d, 52e, 52f, 52h, and 52j for coupling and communication with the plurality of ports 50 extending through the torch receptacle 40. For example, the fitting 52a receives an electrical wire for providing, a negative lead for the electrode 64 of the plasma torch body 62. The fitting 52b provides a connection for return of coolant supplied via fitting 52c. Fitting 52d provides passage of plasma gas to the plasma torch body 62, fitting 52e provides a connection to vent gas from the plasma torch body 62, and fitting 52f provides a passage for shield gas. Fitting 52h provides a passage for a pilot arc wire into the plasma torch body 62. Fitting 52j provides a passage for an initial height sense wire to the plasma torch body 62. Clearly, these fittings correspond to ports labeled with corresponding letters in the torch receptacle 40. Therefore, the ports 50a, 50b, 50c, 50d, 50e, 50f, 50h, and 50j comprise the plasma subset of the plurality of ports 50.

Each of the passages 70, 72, 74, 76 in the plasma torch body 62 (FIG. 5), is in fluid communication with a respective fitting 52 in the plasma torch body 62. For example, the plasma gas fitting 52d is in fluid communication with the plasma gas passage 70. The coolant supply fitting 52c is in fluid communication with one of the cooling liquid passages 72, and the coolant return fitting 52b is in fluid connection with the other of the cooling liquid passages 72. The shield gas fitting 52f is in fluid communication with the shield gas passage 74. Further, the negative lead fitting 52a is in communication with the passage 76 that allows for passage of a negative lead to contact the electrode 64.

Figure 7:
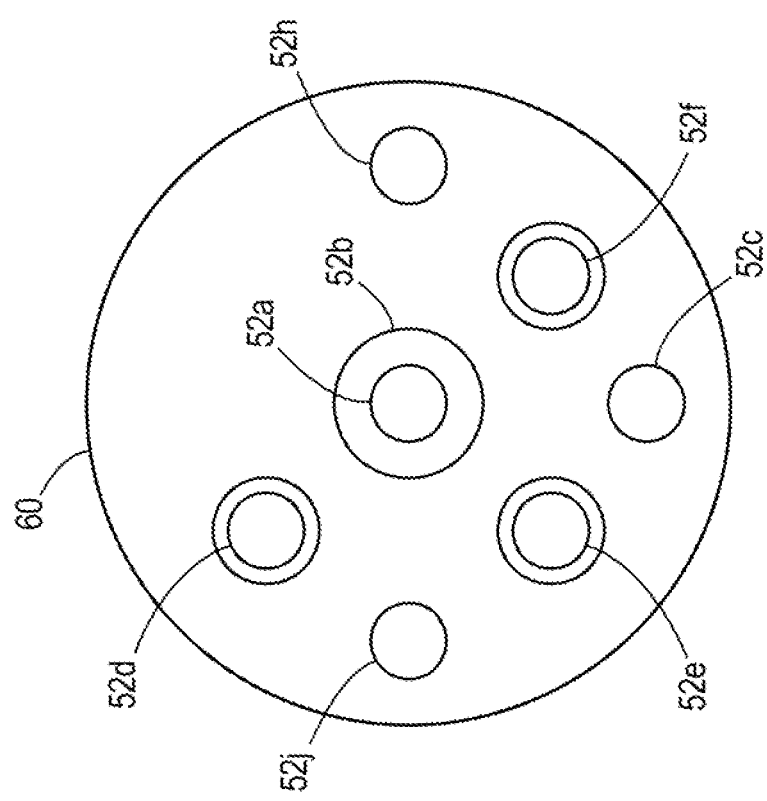
FIG. 7 depicts one example of an end view of a plasma torch body.

It can be seen from comparison from FIGS. 3, 6, and 7 that the plurality of ports 50 in the torch receptacle 40 align with and communicate with the fittings 52 in the plasma torch body 62 and the oxy-fuel torch body 69. Further, in order to save space in the torch receptacle 40 and to facilitate easy connection of one of the torch bodies 62, 69 to the torch receptacle 40, one or more of the ports in the plasma subset of the plurality of ports 50 is common with one or more ports in the ox-fuel subset of the plurality of ports 50. For example, comparison of these figures shows that ports 50b, 50c, 50d, 50e, 50f, and 50h are part of both the plasma subset and the oxy-fuel subset of the plurality of ports 50. Different gases flow through these ports depending on what type of torch body is connected to the torch receptacle 40. Further, different electrical connections are made through these ports depending on what type of torch body is connected to the torch receptacle 40. Valves may be provided to close off ports 50 that are unused when a certain torch body 36 is connected to the torch receptacle 40.

Figure 8:
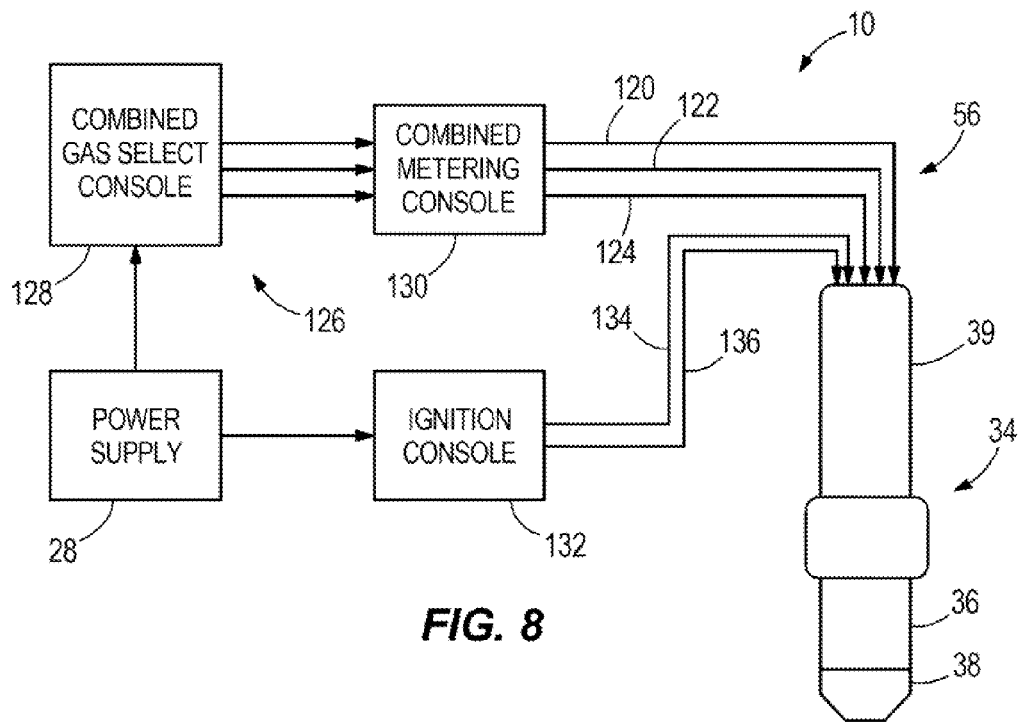
FIG. 8 depicts an alternative example of a system for thermally working a workpiece.

Now with reference to FIG. 8, another example of a system for thermally working a workpiece will be described. FIG. 8 shows the torch assembly 34 including torch body 36, nozzle 38, and sleeve 39. Although not shown herein, it should be understood that the torch receptacle 40 is hidden within the sleeve 39 of the torch assembly 34. In the example shown herein, the plurality of leads 56 comprises first and second hoses 120, 122. The plurality of leads 56 further comprises a third hose 124. As described herein above, each of the first, second, and third hoses 120, 122, and 124 is connected to a port 50 within the torch receptacle 40. The ports 50 are thereafter connected to fittings 52 in the torch body 36. The fittings 52 are connected to passageways provided within the torch body 36 for conveying electricity and gases to the nozzle 38 for thermally working a workpiece.

The system 10 further comprises a combined gas console 126, in the embodiment shown, comprising a combined gas select console 128 and a combined metering console 130. The combined gas select console 128 allows an operator of the system 10 to select the gases that the operator wishes to provide to the torch assembly 34. The combined metering console 130 further mixes and meters these gases using a plurality of valves to provide control over the amount and mixture of gases provided to the torch assembly 34. In general, the combined gas console 126 allows an operator of the system to select a plasma gas to flow through one of the first and second hoses 120, 122 and a shield gas to flow through the other of the first and second hoses 120, 122 to facilitate plasma working. Alternatively, the combined gas console 126 allows an operator of the system to select oxygen to flow through one of the first and second hoses 120, 122 and fuel gas (propane, propylene, etc.) to flow through the other of the first and second hoses 120, 122 to facilitate oxy-fuel working. When the torch body 36 connected to the torch assembly 34 is an oxy-fuel torch body 69, the combined gas console 126 further allows an operator to select a high pressure flow of oxygen to flow through the third hose 124. Such selection of gases can additionally or alternatively be done using the CNC 20 (FIG. 1).

The system further comprises a power supply 28 providing power to both the combined gas select console 128 and an ignition console 132. Alternatively, more than one power supply 28 can be provided to the system. The power supply 28 can also supply power to other system components, although such connections are not shown herein. Two leads comprising electrical wires 134, 136 run from the ignition console 132 to the torch assembly 34. One of the wires 134 provides power to the pilot arc wire when the torch body 36 in the torch assembly is a plasma torch body 62. The other of the wires 136 provides a negative lead to the electrode 64 via passage 76 when the plasma torch body 62 is connected, as shown and described herein above with reference to FIG. 5. It should be understood that when the torch body 36 in the torch assembly 34 is an oxy-fuel torch body 69, the wires 134, 136 are used to provide power to the magnetic height sensing system coil wires and the igniter wire. It should also be understood that when the torch body 36 is a plasma torch body 62, the power supply can also be used to provide power to the initial height sense wire described hereinabove.

Figure 9:
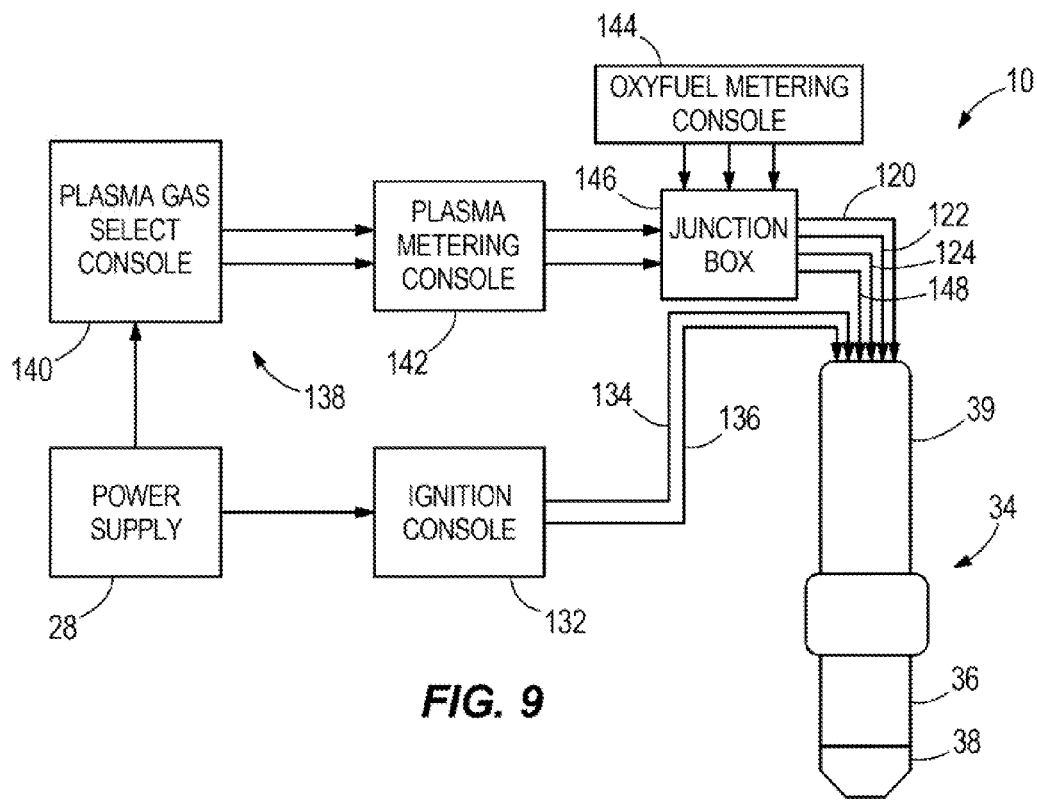
FIG. 9 depicts another alternative example of a system for thermally working a workpiece.

Now with reference to FIG. 9, an alternative system for thermally working a workpiece will be described. The system 10 shown in FIG. 9 comprises a plasma gas console 138, in the embodiment shown comprising a plasma gas select console 140 and a plasma metering console 142. The plasma gas console 138 is in selective fluid communication with the first and second hoses, 120, 122. The plasma gas console 138 allows an operator of the system to select a plasma gas to flow through one of the first and second hoses 120, 122 and shield gas to flow through the other of the first and second hoses, 120, 122 to facilitate plasma working. In contrast to the system shown in FIG. 8, the system of FIG. 9 further comprises an oxy-fuel metering console 144 and a junction box 146. The oxy-fuel metering console 144 is in selective fluid communication with the first and second hoses 120, 122. The oxy-fuel metering console 144 allows the operator of the system to select oxygen to flow through one of the first and second hoses 120, 122 and a fuel gas to flow through the other of the first and second hoses 120, 122 to facilitate oxy-fuel working. Such selection of gases can additionally or alternatively be done using the CNC 20 (FIG. 1).

The junction box 146 allows the operator of the system to select fluid communication from one of the plasma gas console 138 and the oxy-fuel metering console 144 to the first and second hoses 120, 122. For example, the junction box 146 can be provided with three-way valves that provide communication from the oxy-fuel metering console 144 to the first and second hoses 120, 122 or that alternatively provide communication from the plasma gas console 138 to the first and second hoses 120, 122. Junction box 146 further can mix an ignition gas to aid in ignition when the torch assembly 34 comprises an oxy-fuel torch body 69. The junction box 146 receives the fuel gas and the oxygen from the oxy-fuel metering console 144, mixes the fuel gas and the oxygen to create the ignition gas, and provides the ignition gas to the oxy-fuel torch body 69 through the third hose 124 in the plurality of leads. (The ignition gas is provided through passage 117, FIG. 4.) The mixer within the junction box 146 comprises a flashback arrestor and a solenoid shutdown valve. When the torch body 36 is an oxy-fuel torch body 69, the oxy-fuel metering console 144 further supplies high pressure oxygen via the junction box 146 to the torch assembly 34 via a forth hose 148.

The power supply 28, ignition console 132, and wires 134, 136 are similar to those described those herein above regarding FIG. 8.

Figure 10:
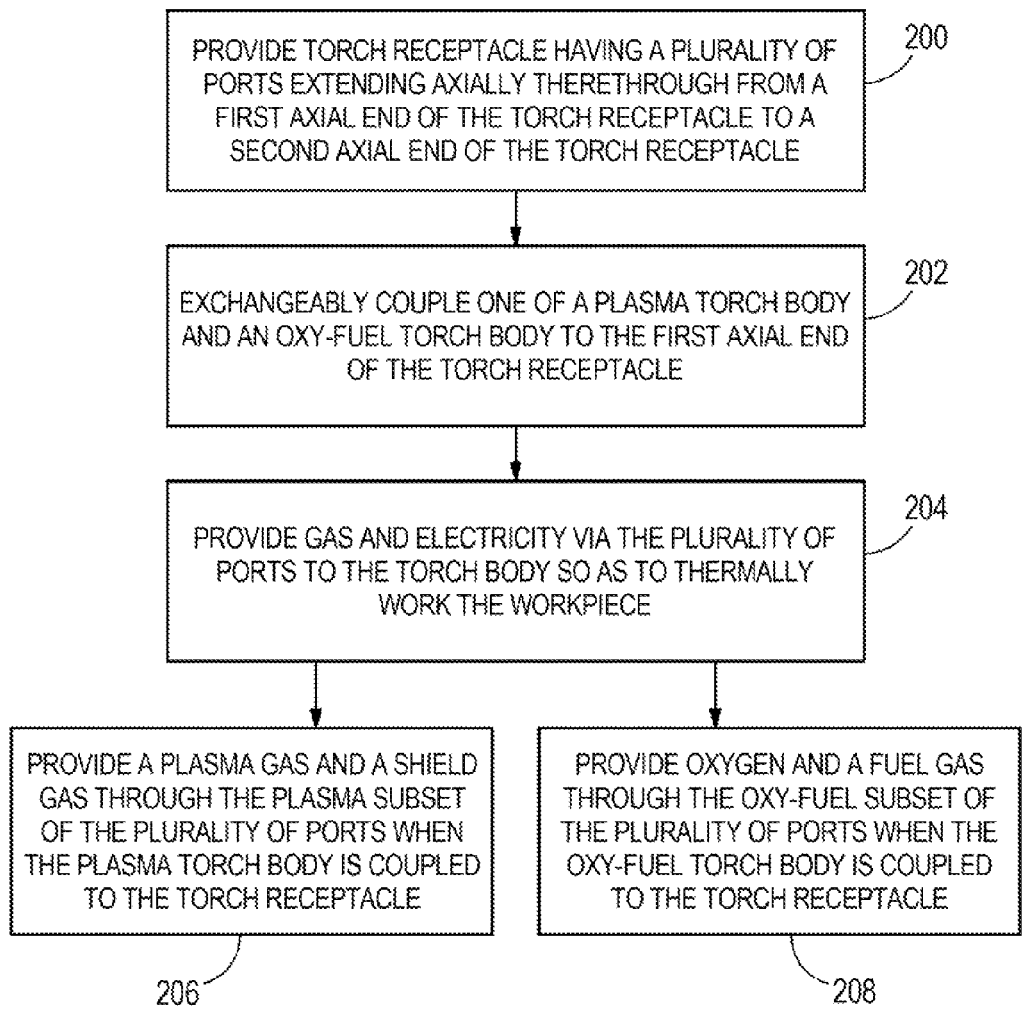
FIG. 10 is a flow chart that depicts an example of a method for thermally working a workpiece.

Now with reference to FIG. 10, a method for thermally working a workpiece will be described. As shown at step 200, the method comprises providing a torch receptacle 40 having a plurality of ports 50 extending axially therethrough from a first axial end 46 of the torch receptacle to a second axial end 48 of the torch receptacle. The method further comprises, as shown at 202, exchangeably coupling one of a plasma torch body 62 and an oxy-fuel torch body 69 to the first axial end 46 of the torch receptacle 40. The plasma torch body 62 has a plurality of fittings for coupling with a plasma subset of the plurality of ports 50 and the oxy-fuel torch body 69 has a plurality of fittings for coupling with an oxy-fuel subset of the plurality of ports 50. The method further comprises, as shown at 204, providing gas and electricity via the plurality of ports 50 to the torch body 36 so as to thermally work the workpiece 12. As shown at 206, this can be done by providing a plasma gas and a shield gas through the plasma subset of the plurality of ports 50 when the plasma torch body 62 is coupled to the torch receptacle 40. As shown at 208, this could alternatively be done by providing oxygen and a fuel gas through the oxy-fuel subset of the plurality of ports 50 when the oxy-fuel torch body 69 is coupled to the torch receptacle 40. One or more ports in the plasma subset of the plurality of ports 50 is common with one or more ports in the oxy-fuel subset of the plurality of ports 50.

The method may further comprise mixing the fuel was and the oxygen externally of the torch body to create an ignition gas, and providing the ignition gas to the oxy-fuel torch body 69 via a port 52e in the oxy-fuel subset of the plurality of ports 50. This mixing can be done, for example, in a junction box 146 comprising a solenoid valve and a flashback arrestor, as described hereinabove.

The method may also include selecting to cut and/or weld a workpiece using one of an oxy-fuel torch body 69 and a plasma torch body 62 via the CNC 20. Appropriate gases and electrical connections can be selected via the CNC 20 depending on which type of thermal working is selected, and which type of torch body is connected to the torch receptacle 40.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims. Each limitation in the appended claims is intended to invoke interpretation under 35 U.S.C. §112(f), only if the terms "means for" or "step for" are explicitly recited in the respective limitation.

What is claimed is:

1. A system for thermally working a workpiece, the system comprising:
   a torch body having a first axial end positionable near the workpiece;
   a torch receptacle coupled to a second axial end of the torch body;
   a plurality of ports extending axially through the torch receptacle from a first axial end of the torch receptacle to a second axial end of the torch receptacle; and
   a plurality of fittings provided at the second axial end of the torch body for communication with a subset of the plurality of ports;
   wherein the torch body comprises one of a plasma torch body and an oxy-fuel torch body that is exchangeably coupled to the torch receptacle;
   wherein the subset of the plurality of ports is a plasma subset when the plasma torch body is coupled to the torch receptacle; and
   wherein the subset of the plurality of ports is an oxy-fuel subset when the oxy-fuel torch body is coupled to the torch receptacle.

2. The system of claim 1, further comprising a plurality of leads coupled to the plurality of ports at the second axial end of the torch receptacle, the plurality of leads providing gas and electricity to the torch body.

3. The system of claim 2, wherein the plurality of leads comprises a plasma subset that communicates with the plasma subset of the plurality of ports, and an oxy-fuel subset that communicates with the oxy-fuel subset of the plurality of ports.

4. The system of claim 3, wherein a port in the plasma subset of the plurality of ports is common with a port in the oxy-fuel subset of the plurality of ports, and a corresponding lead in the plasma subset of the plurality of leads is common with a lead in the oxy-fuel subset of the plurality of leads.

5. The system of claim 2, wherein the plurality of leads comprises first and second hoses.

6. The system of claim 5, further comprising a combined gas console in fluid communication with the first and second hoses, wherein the combined gas console allows an operator of the system to select a plasma gas to flow through one of the first and second hoses and a shield gas to flow through the other of the first and second hoses to facilitate plasma working, or alternatively to select oxygen to flow through one of the first and second hoses and fuel gas to flow through the other of the first and second hoses to facilitate oxy-fuel working.

7. The system of claim 5, further comprising a plasma gas console in selective fluid communication with the first and second hoses, wherein the plasma gas console allows an operator of the system to select a plasma gas to flow through one of the first and second hoses and a shield gas to flow through the other of the first and second hoses to facilitate plasma working.

8. The system of claim 7, further comprising an oxy-fuel metering console in selective fluid communication with the first and second hoses, wherein the oxy-fuel metering console allows the operator of the system to select oxygen to flow through one of the first and second hoses and a fuel gas to flow through the other of the first and second hoses to facilitate oxy-fuel working.

9. The system of claim 8, further comprising a junction box that allows the operator of the system to select fluid communication from one of the plasma gas console and the oxy-fuel metering console to the first and second hoses.

10. The system of claim 9, wherein the junction box further receives the fuel gas and the oxygen from the oxy-fuel metering console, mixes the fuel gas and the oxygen to create an ignition gas, and provides the ignition gas to the oxy-fuel torch body through a third hose in the plurality of leads.

11. The system of claim 1, wherein the oxy-fuel torch body comprises a glow plug for internal ignition.

12. The system of claim 1, wherein the oxy-fuel torch body comprises an internal magnetic height-sensing system.

13. The system of claim 1, wherein the oxy-fuel torch body comprises internal flashback arrestors.

14. The system of claim 1, wherein each of the oxy-fuel torch body and the plasma torch body comprises quick-connect fittings for holding torch consumables.

15. The system of claim 1, wherein the first axial end of the torch receptacle comprises a quick-connect fitting for coupling with a mating quick-connect fitting on the second axial end of the torch body.

16. A method for thermally working a workpiece, the method comprising:
   providing a torch receptacle having a plurality of ports extending axially therethrough from a first axial end of the torch receptacle to a second axial end of the torch receptacle;
   exchangeably coupling one of a plasma torch body and an oxy-fuel torch body to the first axial end of the torch receptacle; and
   providing gas and electricity via the plurality of ports to the one of the plasma torch body and the oxy-fuel torch body so as to thermally work the workpiece;
   wherein the plasma torch body has a plurality of fittings for coupling with a plasma subset of the plurality of ports;
   wherein the oxy-fuel torch body has a plurality of fittings for coupling with an oxy-fuel subset of the plurality of ports; and wherein one or more ports in the plasma subset of the plurality of ports is common with one or more ports in the oxy-fuel subset of the plurality of ports.

17. The method of claim 16, further comprising providing a plasma gas and a shield gas through the plasma subset of the plurality of ports when the plasma torch body is coupled to the torch receptacle.

18. The method of claim 16, further comprising providing oxygen and a fuel gas through the oxy-fuel subset of the plurality of ports when the oxy-fuel torch body is coupled to the torch receptacle.

19. The method of claim 18, further comprising mixing the fuel gas and the oxygen externally of the oxy-fuel torch body to create an ignition gas, and providing the ignition gas to the oxy-fuel torch body via a port in the oxy-fuel subset of the plurality of ports.

\* \* \* \* \*